Oct. 29, 1935.  E. BENEDINI  2,019,386
STONE SAWING MACHINE
Filed Nov. 5, 1934  3 Sheets-Sheet 1

Ezio Benedini
INVENTOR

By Victor J. Evans & Co.
ATTORNEY

WITNESS: Lee Smith

Oct. 29, 1935.  E. BENEDINI  2,019,386

STONE SAWING MACHINE

Filed Nov. 5, 1934   3 Sheets-Sheet 2

EZIO BENEDINI
INVENTOR

By Victor J. Evans & Co.
ATTORNEY

Oct. 29, 1935.  E. BENEDINI  2,019,386
STONE SAWING MACHINE
Filed Nov. 5, 1934  3 Sheets-Sheet 3
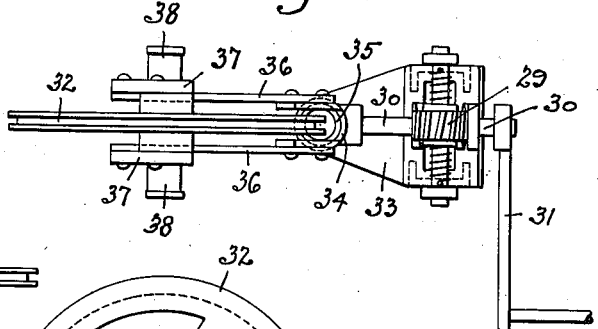
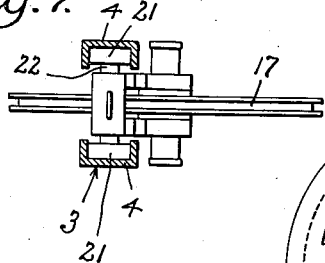
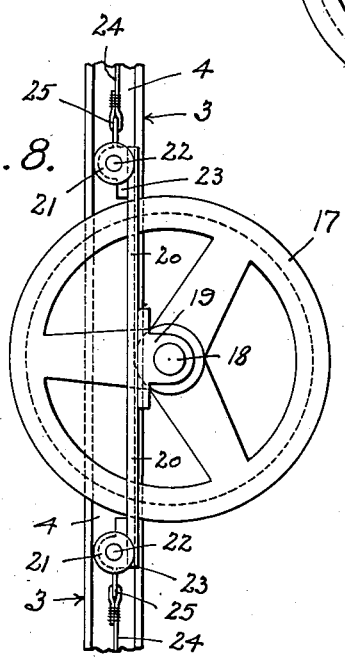
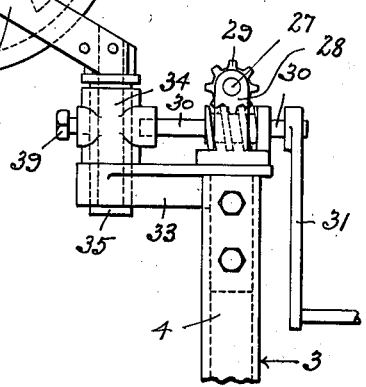
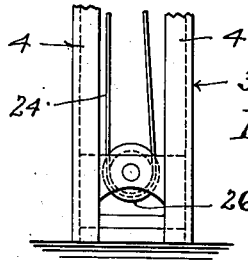
Ezio Benedini
INVENTOR
By Victor J. Evans + Co.
ATTORNEY Patented Oct. 29, 1935

2,019,386

UNITED STATES PATENT OFFICE 2,019,386

STONE SAWING MACHINE

Ezio Benedini, Barre, Vt.

Refiled for abandoned application Serial No. 469,215, July 19, 1930. This application November 5, 1934, Serial No. 751,650

1 Claim. (Cl. 125—21)

The invention relates to machines for cutting large blocks or slabs of stone, and the invention has as one of its objects to provide a machine for this purpose which may be so adjusted as to cut slabs of any desired thickness.

Another object of the invention is to provide a machine for the purpose stated which may be conveniently installed, in situ, on ledges and in quarries for the delivery thereto of blocks of granite or other stone, to be cut.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:

Figure 1 is a view in side elevation of the machine embodying the invention.

Figure 2 is a top plan view of the machine.

Figure 5 is a top plan view of an adjusting and tensioning means for the cutting cable of the machine.

Figure 6 is a view in side elevation of the structure shown in Figure 5.

Figure 7 is a top plan view of one of the uprights of the machine upon which the guiding means is mounted.

Figure 8 is a view in elevation of the structure shown in Figure 7.

Figure 9 is a view similar to Figure 8 illustrating the lower end of one of the uprights and a cable means for elevating and lowering the cutting cable.

Figure 3:
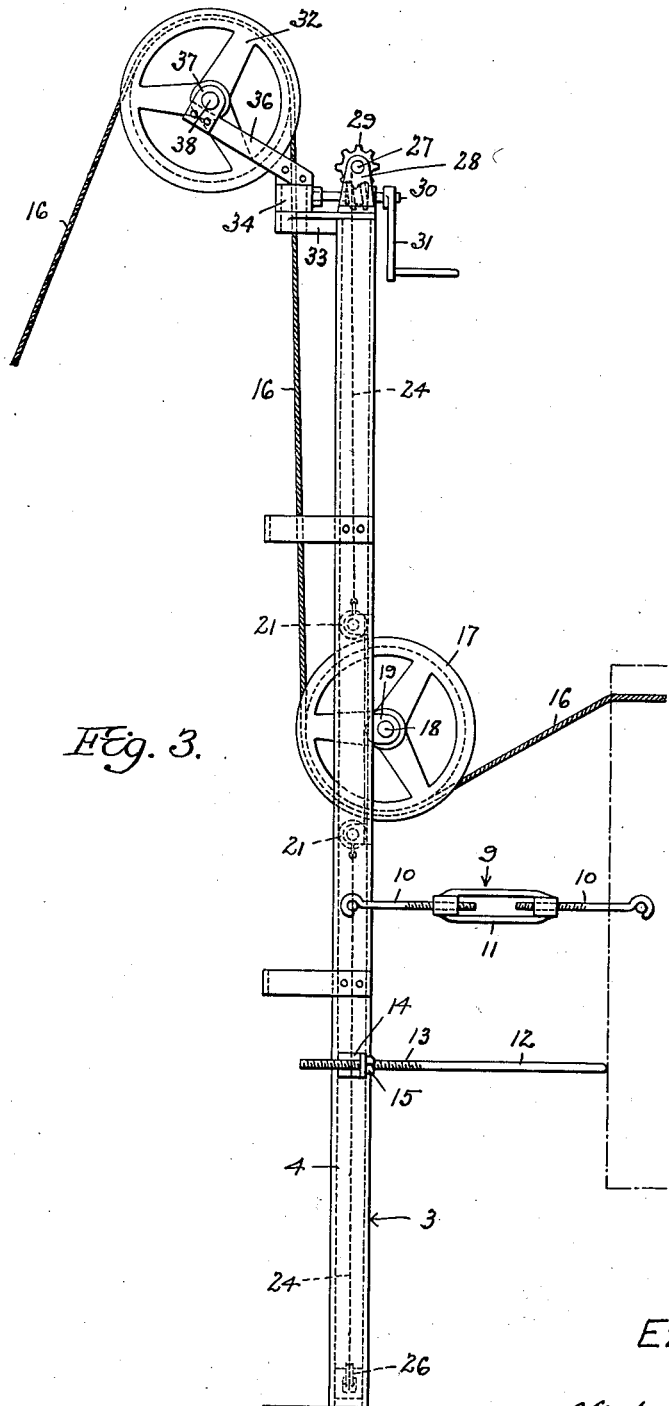
Figure 3 is a detail view in elevation of one end of the machine.
Figure 4:
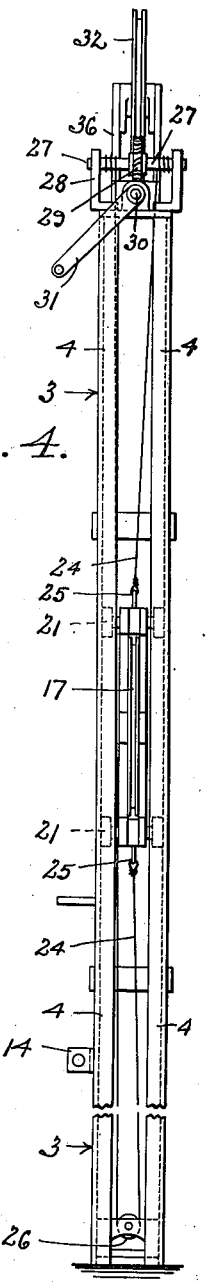
Figure 4 is a side elevation of the structure shown in Figure 3.

As above stated, the machine embodying the invention is to be employed in situ, or in other words, at any point at a clearing where it would be most convenient to deliver the block, to be cut, to the machine, and preferably a location will be selected where a level ground surface 1, somewhat elevated, is available and preferably a lower ground surface adjacent thereto, or the ground surface may be worked by scrapers and scoops in order to provide the desired contour to accommodate the parts of the machine. The machine consists essentially of a pair of uprights indicated by the numeral 3, each of which comprises a pair of channeled beams, indicated by the numeral 4, the channels of these beams being presented toward each other and the beams being mounted at their lower ends in upright position, in any suitable manner. Laterally disposed with respect to one of the uprights is an anchoring upright indicated by the numeral 5, which serves a purpose to be presently explained, and similar uprights 6 and 7 being arranged near the brink of the elevated earth surface 1. The block of granite or stone to be cut is supported between the uprights 3, upon a suitable arrangement of supporting beams or blocks, indicated by the numeral 8 in a true horizontal position, assuming that the block is to be cut into slabs, by the formation of incisions in vertical planes in the block, as will be apparent by reference to Figures 1 and 3 of the drawings.

The block of granite, which is indicated by the reference character G, is relatively braced with respect to the uprights 3 and equidistantly spaced between the same by braces 9 embodying rods 10 connecting each at one side of each end of the block and the other rod of each brace to the corresponding side of the respective upright 3, a turnbuckle 11 being provided for adjustably connecting the said rods. The block is further braced by rods 12 which are arranged to bear at their ends against the faces of the block which are presented toward the uprights 3, and which rods, at their other ends, are threaded as indicated by the numeral 13, and fitted through brackets 14 upon the respective uprights, a nut 15 being fitted onto the threaded portion of each rod and adjustable to bind against the respective bracket 14, when the nut is rotated, so that pressure may be exerted against the block of granite G near the lower portion thereof, it being observed that the braces 9 are connected with the block adjacent the horizontal middle thereof.

The cutting medium of the machine is in the nature of a cable such, for example, as a four-wire twisted cable of cold steel and this cable is indicated in the drawings by the numeral 16 and is led transversely across the upper side of the block of granite G and then about pulleys 17 which are rotatably mounted upon spindles 18 journaled in a bearing comprising bearing members 19 and mounted upon a plate of oblong form, indicated by the numeral 20, and which plate is slidable along the flanges of the angle irons 4 comprising the uprights 3, rollers 21 being journaled upon suitable spindles 22 extending from the opposite sides of bearings 23' upon the said plate at the upper and lower ends of the plate. The purpose of this construction is to provide means whereby the pulleys 17 may be vertically adjusted upon the uprights 3 and this means further comprises an endless cable 24 which is connected at its ends to the said bearing 23, as indicated by the numeral 25 upon each of the uprights, the cable being passed about an idle pulley 26 at the lower end of each upright and about the end portions of a shaft 27, which is rotatably mounted in a bearing head 28 at the upper end of the upright, a worm pinion 29 being fixed upon the shaft and a worm shaft 30 being mounted upon the bearing head 28 and provided with a crank handle 31, whereby it may be rotated so as to effect rotation of the shaft 27 and effect travel of the cable 24, so as to effect up and down movement of the bearing for the respective pulley 17, whereby raising or lowering that stretch of the cable 16 which extends between the two pulleys 17. These pulleys 17 are idle pulleys and the stretches of the cable 16 are led upwardly from the pulleys 17 and over other idle pulleys indicated by the numeral 32, and which pulleys are mounted for adjustment in various ways, as will now be described.

The mounting means for the pulleys 32 is clearly illustrated in detail in Figures 5 and 6 of the drawings, and the mounting comprises an extension 33 which extends from the bearing head 28 and has upon its upper side a tubular bearing 34 in which is rotatably mounted a spindle 35 from the upper end of which extend spaced arms 36 carrying at their outer and upper ends, the arms being upwardly inclined, bearing members 37 in which are journaled the ends of the spindle of the pulley 32, grease cups 38 being provided upon the said bearing members 37.

A set screw 39 is fitted through the side of the sleeve 34 and is adapted to be tightened so as to hold the spindle 35 in any desired position of its rotative adjustment, and, therefore, provide for positioning of the arms 36 at any desired angle with respect to the respective uprights 3.

The rotation of the crank handle 31 will effect rotation of the shaft 30 and the worm of this shaft will rotate the worm pinion 29 so as to wind or unwind the cable 24 and thus raise or lower the bearing for the idle pulley 17.

In order that the stretch of the cable 16 which travels between the pulleys 17 may be constantly tensioned during the cutting operation, so as to cut through the block of granite or stone, the cutting cable 16 is led downwardly from the pulleys 32 and when stretched thereover is led about an idle pulley 40 mounted upon the upright 5 and thence about a pulley 41 upon the upright 6. The cable is then passed about an idle pulley 42 mounted upon the front of a cart 43 which is provided with supporting wheels 44 running on track trails 45 which are inclined at an angle of approximately 45° and extend from the upper or elevated supporting ground surface 1 and the lower surface 2, and, after passing about the pulley 43, the cable is led about an idle pulley 46 upon one side of the upright 7 and about a pulley of large diameter indicated by the numeral 47 and which pulley is mounted upon the shaft 48 of an electric motor indicated by the numeral 49.

From the foregoing description of the invention, it will be seen that, inasmuch as the cart 43, which may be filled with pieces of granite, or other stone, places sufficient tension on the cable 16 to insure of its passage through the block of granite G as the cable, which is endless, is caused to travel transversely of the block, at its stretch which extends between the pulleys 17, and in practice, it will be found desirable to maintain a pile 50 of some powdered or granular abrasive, and a barrel or other container 51 for water, upon the upper side of the block, so that a mixture of the pile 50 and water may be delivered into the incision being made in the block of granite, and thus assist in the cutting action of the cutting cable, it will also be evident, at this point, that by rotating the crank handles 31 in one direction, the cable 24 may be paid out at its stretch which is connected with the bearing 21, so as to provide for lowering of the pulleys 17 with respect to the uprights 3, gradually, as the stretch of the cable which passes between the pulleys 17 cuts through the block of granite, and, of course, rotation of the crank handle in the opposite direction will serve to return the pulleys 17 to their elevated positions after the cable has cut entirely through the block of granite or to such depth as may be required.

From the foregoing description of the invention it will be evident that while, in the illustrated embodiment, the shafts 18 may be mounted at right angles to the position shown in the drawings or at any other angle between the horizontal and vertical, where it is required to make cuts sidewise from the machine, and this change in position of the shafts may be effected by changing the positions of the uprights 3.

What is claimed is:

In a machine for cutting a block of stone into slabs, spaced uprights, pulleys mounted thereon, an endless cutting cable trained about the pulleys with one stretch extending between the uprights to extend over the block to be cut, means for imparting travel to the cable, means for feeding the pulleys downwardly along the uprights to feed the said stretch of the cable through the block, as the cutting of the block progresses, and a brace connected at one end to each upright to extend horizontally therefrom and provided with means at its other end for temporary anchorage to the block to be cut, the said means being adjustable as to length, and another brace for each upright comprising a thrust rod, a bearing upon the upright through which the rod is engageable and the portion of the rod which is engaged through the bearing being threaded, and a nut threaded upon the portion of the rod and adjustable to bear against the said bearing and to effect feeding of the rod therethrough in the direction of the block.

EZIO BENEDINI.